Figure 1:
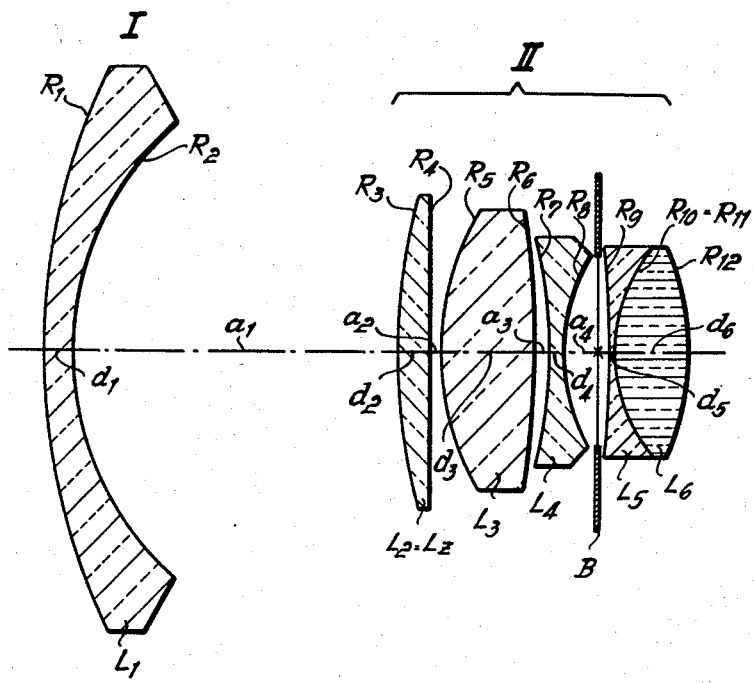

March 8, 1960     F. DETERMANN     2,927,506
PHOTOGRAPHIC OBJECTIVE
Filed Sept. 9, 1957     3 Sheets—Sheet 1

INVENTOR
FRITZ DETERMANN

March 8, 1960    F. DETERMANN    2,927,506
PHOTOGRAPHIC OBJECTIVE

Filed Sept. 9, 1957    3 Sheets-Sheet 2

INVENTOR
FRITZ DETERMAN

BY
Mocker Blum
ATTORNEYS

March 8, 1960 F. DETERMANN 2,927,506
PHOTOGRAPHIC OBJECTIVE
Filed Sept. 9, 1957 3 Sheets-Sheet 3

INVENTOR
FRITZ DETERMAN
BY
ATTORNEYS

United States Patent Office 2,927,506
Patented Mar. 8, 1960

2,927,506
PHOTOGRAPHIC OBJECTIVE

Fritz Determann, Braunschweig, Germany, assignor to Voigtländer A.G., Braunschweig, Germany, a corporation of Germany Application September 9, 1957, Serial No. 682,808
Claims priority, application Germany September 12, 1956

6 Claims. (Cl. 88—57)

This invention relates to photographic objectives having a large image angle and has particular relation to such photographic objectives of the enlarged triplet-type having high light-transmitting power and a long back focal length which is in the range of 85% and 125% of the equivalent focal length.

This invention represents a further development of objectives according to the U.S. Patent No. 2,746,351. On the side of the longer conjugate, a diverging meniscus-shaped front member is arranged, the surfaces of which are concave toward the diaphragm and which is separated from the subsequent converging system by a distance which is smaller than ¾ of the equivalent focal length of the pivotal objective, whereby the converging system is a triplet variation provided with a preceding additionally inserted converging lens.

Photographic objectives of the above outlined general structure have, in general, at a useful correction of the spherical zonal aberrations and of the central curving of the image, still noticeable astigmatic adjustment differences between the sagittal and meridional image shells and, at the same time, higher comatic residual aberrations in the lateral portions of the image field. Thereby, in general, the astigmatic adjustment difference, which affects the image structure, is the higher, the larger the back focal length of the objective is selected relative to the equivalent focal length and the more the optical designer endeavors corrections with small zonal aberrations. The above mentioned additional converging lens $L_z$ which is inserted in front of the triplet, contributes to the reduction of zonal aberrations of the apertural defects. However, with increasing improvement of the image performance of widely open pencils of rays, the presence of residual astigmatic adjustment differences has particularly undesired effects in the lateral image portions. The elimination of these defects, without the use of extremely strong surface curvatures (e.g. surfaces having a nearly hemispherical shape) could not be attained in the structures hitherto suggested.

It has now been found that by proceeding according to the present invention the image performance can be considerably improved, and the image extensively freed from the beforementioned astigmatic defects. According to the present invention, the distribution of refractive power within the total objective in the adjacent pair of surfaces ($R_6$, $R_7$) between the diverging lens ($L_4$)— which is enclosed in the converging main system II and is of unequal curvature of the surfaces—and the strongly refractive converging lens ($L_3$), which precedes it on the side of the longer conjugate, is selected in the following manner: The absolute value of the sum of the two surface refractive powers ($\varphi_6 + \varphi_7$) of these two adjacent surfaces is greater than ¼ of the equivalent refractive power ($\Phi$) of the total system, without, however, exceeding the value of ¾ of this total refractive power. If this upper limit is exceeded, then again said undesired progressive increase of the astigmatic adjusting difference occurs in the zonal ranges of the out-of-axis image field.

This increase adversely affected production of the image in older constructions, while at values below said lower limit the apertural aberrations are so strongly increased that only small relative apertures can be successfully utilized, i.e. the useful light-transmitting capacity of such systems will be noticeably reduced.

This first condition of the present invention is expressed by the following formula:

(1) $$\tfrac{1}{4}\Phi < |\varphi_6 + \varphi_7| < \tfrac{3}{4}\Phi$$

Due to the connection between refractive power and surface curvature in the range of the refractive indices of conventional glasses, the above Formula 1 represents a guide also with regard to the selection of the curvature of this pair of adjacent surfaces, because this selection of curvature yields also the possibility of favorably affecting the zonal aberrations of widely open extra-axial pencils. The curvature of a glass or air lens—i.e. of a vicinal pair of surfaces—is defined, in a manner known by itself, by the sum of radii on the one hand and the difference of radii on the other hand, or by the sum of refractive powers on the one hand and the difference of refractive powers on the other hand. Accordingly, the second condition of the present invention consists in that the absolute value of the difference of this vicinal pair of surfaces ($\varphi_6 - \varphi_7$) is larger than ½ of the equivalent refractive power ($\Phi$) of the total system, but does not exceed 3/2 of this total refractive power. This second condition according to the invention is expressed by the following formula:

(2) $$\tfrac{1}{2}\Phi < |\varphi_6 - \varphi_7| < \tfrac{3}{2}\Phi$$

By observing this second condition, it is additionally possible to obtain a particularly good extra-axial zonal correction of apertural defects, whereby practical utilization of high, relative beam openings is secured also for the lateral image.

In this manner according to the invention, an increased power of the objective and at the same time an improved quality of the image by reduction of astigmatic and comatic aberrations is obtained.

An increase of the relative aperture of optical systems at predetermined dimensions, and thus for predetermined diameters of the lenses, always means an increase of the refractive powers of the converging elements and in this connection a further condition of the present invention, which relates to the additional converging lens $L_z$, is used. The sum of refractive powers of the surfaces of this lens, should be linked with the absolute value of the sum of surface refractive powers of the beforementioned characteristic pair of vicinal surfaces in such a manner that the quotient of the absolute value of the sum of refractive powers ($\varphi_6 + \varphi_7$) of the pair of vicinal surfaces ($R_6$, $R_7$) divided by the sum of surface refractive powers ($\varphi_3 + \varphi_4$) of this converging lens $L_z$, is in the range between 0.25 and 1.25.

This condition—expressed by the corresponding reciprocal value—means that the sum of surface refractive powers of lens $L_z$ (i.e. its elementary lens refractive power) constitutes a positive refractive power portion of the total refractive power of the objective, which is more than 80% of the absolute value of the sum of surface refractive powers of said characteristic pair of vicinal surfaces ($R_6$, $R_7$), whereby, however, the lens refractive power of lens $L_z$ is smaller than the fourfold of said absolute value. A too strong converging effect of lens $L_z$ would too strongly reduce the influence of the pair of vicinal surfaces and this, in turn, would result in an increase of the astigmatic adjustment difference. This condition of the present invention is expressed by the following formula:

(3) $$0.25 < \frac{|\varphi_6 + \varphi_7|}{\varphi_3 + \varphi_4} < 1.25$$

In order to correct—in an objective designed in conformity with the above conditions—the distortion to particularly small residual amounts, it has been found advisable to tune the curvature of the four lenses located in front of the diaphragm, in a specific relation. According to the latter, the absolute value of curvature of the negative meniscus-shaped front lens ($L_1$), represented by the quotient of the refractive power difference ($\varphi_1 - \varphi_2$), divided by the refractive power sum ($\varphi_1 + \varphi_2$), in relation to the distance ($a_1$) between this negative lens ($L_1$) and the subsequent converging lens ($L_2$), should have a value which is in the range between the fourfold and the ninefold of the value of the equivalent refractive power ($\Phi$) of the total objective. This condition is expressed by the following formula:

(4) $$4 \cdot \Phi < \frac{\left|\frac{\varphi_1 - \varphi_2}{\varphi_1 + \varphi_2}\right|}{a_1} < 9 \cdot \Phi$$

In addition, simultaneously, the relation between (a) the absolute ratio of the curvature of the second lens ($L_2 = L_z$) of the system, to the curvature of the third lens ($L_3$)—and (b) the absolute ratio of the curvature of this third lens, to the curvature of the fourth lens ($L_4$)—should correspond to at least 1:1, but should not exceed 3:1. If the curvature of a lens having surfaces $i$ and $k$ is denoted $$D_L = \frac{\varphi_i - \varphi_k}{\varphi_i + \varphi_k}$$

the above outlined condition can be expressed by the following formula:

(5) $$1 < \frac{\left|\frac{D_2}{D_3}\right|}{\left|\frac{D_3}{D_4}\right|} < 3$$

It is within the scope of the present invention to design the negative meniscus-shaped front member (I) as a single lens, without adversely affecting the image performance. The expenses of manufacture are thereby considerably reduced, particularly in view of the fact that this lens should have a particualrly large diameter.

Without adversely affecting the image performance, the three lenses of the converging triplet, preceding the diaphragm, can likewise consist of uncemented single lenses ($L_2$, $L_3$, $L_4$).

In connection with the correction of extra-axial aberrations, it has been found advisable to design the converging lens ($L_3$), which precedes the diverging lens ($L_4$), with a relatively large central thickness. The range of 10%–25% of the equivalent focal length of the total objective has been found to be particularly advantageous in this connection.

It has been further found that a favorable influence on the apertural defects of the total system can be obtained by having in the rear member which follows the diaphragm, a cemented surface (of the type known by itself in triplet variations) which is convex toward the diaphragm.

The particular advantage of wide angle objectives of the present invention, which have a long back focal length, consists in the increase of the relative aperture to values above 1:4, with a simultaneous improvement of the correction of extra-axial image defects.

The following examples describe some specific embodiments and best modes of carrying out the invention, to which the invention is not limited.

In the first of these examples, the above mentioned converging additional lens $L_z$ consists of a very strongly curved meniscus, both radii of which are considerably smaller than the equivalent focal length of the total objective. In the second example, the radii of this lens $L_z$ are considerably flatter, i.e. this lens is designed as a relatively weakly curved meniscus. Finally, in the third example the lens $L_z$ is designed as a biconvex lens of unequal curvature. In Example 2, the converging component of the characteristic pair of vicinal surfaces ($R_6$, $R_7$), is the rear surface of a converging lens on the side of the longer conjugate, the refractive index of said lens being larger than that of the subsequent diverging lens $L_4$. In Example 3, which illustrates a higher light intensity, the refractive index of the individually arranged diverging lens $L_4$ is larger than that of the preceding converging lens, so that thereby the diverging partial component of the refractive power of the diverging pair of vicinal surfaces has a higher refractive index than the converging component. Furthermore, in Examples 1 and 2, the meniscus-shaped diverging front lenses (I) of the total system are made of very low-refractive glasses (refractive index of about 1.5), while in Example 3 this negative front meniscus I is made of highly refractive glass ($n > 1.6$). Furthermore, in Example 1 the radius of curvature of the surface, which follows the diaphragm in the direction of light, has a positive sign, while this sign is negative in Examples 2 and 3. In Example 3, this surface is particularly strongly curved.

These examples demonstrate that within the scope of the present invention considerable variations are available to the designer with regard to the selection of the additional correction elements. Thus, for example, the selection of the glass in the rear member (which limits the total objective on the side of the shorter conjugate) on the image side, was done in such a manner that in this rear member there is a difference of the refractive indices between its two individual components, which amounts to about 0.08 in Examples 1 and 2 and in the objective of highest power according to Example 3, to about 0.04, i.e. is reduced to about the half. If the optical designer continues to proceed in this direction, he will arrive at a difference of refractive indices of 0 and this would result in an individual (i.e. not composite) positive member which concludes the total objective on the side of the shorter conjugate.

In the appended drawings—which are illustrated for a focal length of $f = 100$ mm.—the meaning of the reference symbols is as follows:

R = the radii of curvature of the individual lens surfaces,
d = the distance between the vertexes of the lens surfaces,
a = the distances between the axes of the individual lenses, said symbols being numbered—in conformity with the symbols used in the tables—in the same manner as the lenses L, from the side of the longer conjugate toward the side of the shorter conjugate. The glasses used are characterized by the refractive indices $n$ for the yellow light of the d-line of the helium spectrum having a wave length of $\lambda = 5876$ angstrom units and by the Abbe number $\nu$ for the color dispersion. The diaphragm is denoted by reference symbol B in the drawings.

In the appended drawings

Figure 2:
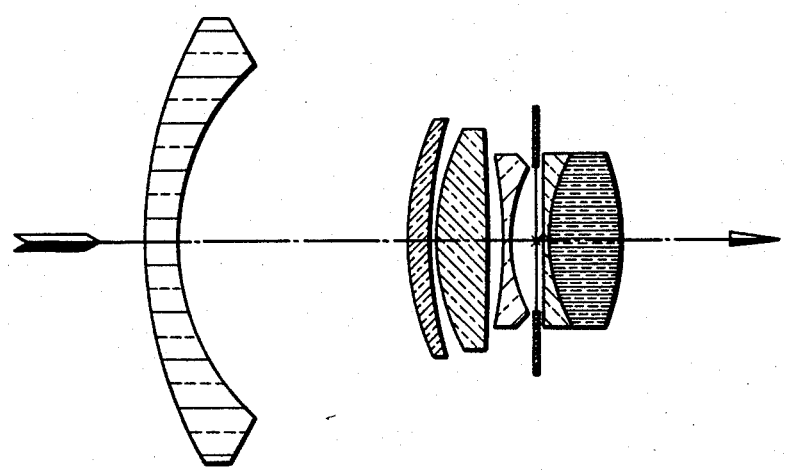
Figure 3:
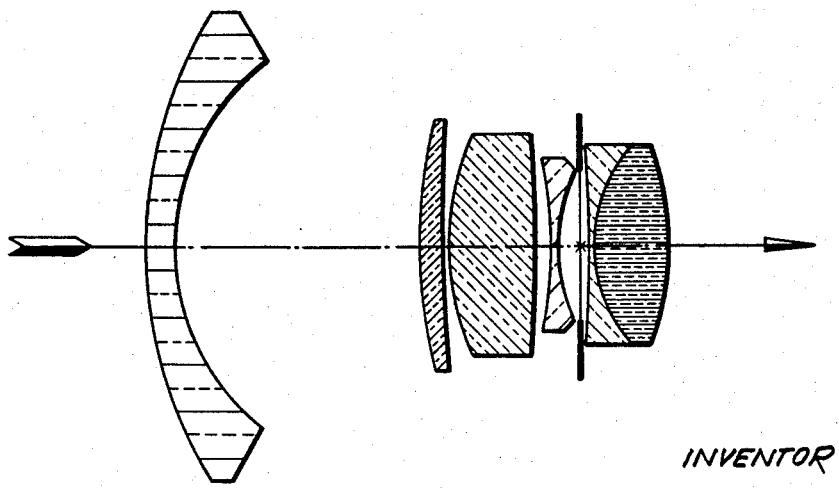
Figure 4:
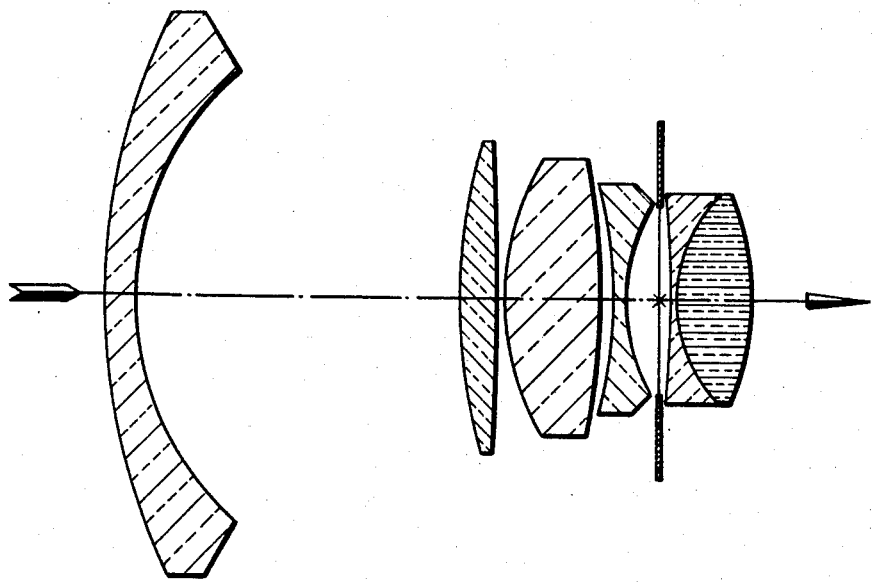

Figure 1 illustrates the scheme of reference symbols;

Figure 2 corresponds to the embodiment according to the data of Example 1;

Figure 3 corresponds to the embodiment according to the data of Example 2;

Figure 4 corresponds to the embodiment according to the data of Example 3.

In the following examples, in connection with each surface, the surface refractive power $$\varphi_i = (n'_i - n_i) : R_i$$

is additionally stated for the surface number $i$. In these tables (which refer to the focal length $f = 1$) the back focal length is denoted by reference symbol $s'_o$. As the equivalent refractive power of the total system is equal to the reciprocal value of the focal length, the former is also equal 1 in the examples.

Example 1

$[f=1.0000 \quad 1:3,4 \quad s'_0=1.0493.]$

| | | | |
|---|---|---|---|
| $R_1 = +0.908302$ | $d_1 = 0.06217$ | $n_1=1.50137; \nu_1=56.5$ | $\varphi_1 = +0.551986$ |
| $R_2 = +0.470316$ | $a_1 = 0.46976$ | air | $\varphi_2 = -1.066028$ |
| $R_3 = +0.535531$ | $d_2 = 0.04698$ | $n_2=1.664466; \nu_2=35.9$ | $\varphi_3 = +1.240750$ |
| $R_4 = +0.878265$ | $a_2 = 0.00497$ | air | $\varphi_4 = -0.756560$ |
| $R_5 = +0.446276$ | $d_3 = 0.10639$ | $n_3=1.62374; \nu_3=47.0$ | $\varphi_5 = +1.397655$ |
| $R_6 = -5.860994$ | $a_3 = 0.03316$ | air | $\varphi_6 = +0.106422$ |
| $R_7 = -0.967161$ | $d_4 = 0.01603$ | $n_4=1.60717; \nu_4=40.2$ | $\varphi_7 = -0.627786$ |
| $R_8 = +0.341792$ | $a_4 = 0.06356$ | air, diaphragm space | $\varphi_8 = -1.776431$ |
| $R_9 = +84.585115$ | $d_5 = 0.01382$ | $n_5=1.61659; \nu_5=36.6$ | $\varphi_9 = +0.007290$ |
| $R_{10} = +0.332924$ | $a_5 = 0.00000$ | Cemented surface | $\varphi_{10} = -1.852044$ |
| $R_{11} = +0.332924$ | $d_6 = 0.15475$ | $n_6=1.69100; \nu_6=54.8$ | $\varphi_{11} = +2.075549$ |
| $R_{12} = -0.570625$ | | | $\varphi_{12} = +1.210953$ |

The above data show:

(I) $\quad |\varphi_6+\varphi_7|=0.521364$ and thus at $\Phi=1$
(1) $\quad 0.25 < 0.521364 < 0.75$ (II) Furthermore, $\quad |\varphi_6-\varphi_7|=0.734208$ and thus
(2) $\quad 0.5 < 0.734208 < 1.5$ (III) Moreover, $|\varphi_6+\varphi_7|=0.521364$ and
$|\varphi_3+\varphi_4|=0.484190$, so that
$\dfrac{|\varphi_6+\varphi_7|}{\varphi_3+\varphi_4}=\dfrac{0.521364}{0.484190}=1.076776$ and (3) $\quad 0.25 < 1.076776 < 1.25$ (IV) Furthermore, $D_1 = \dfrac{|\varphi_1-\varphi_2|}{|\varphi_1+\varphi_2|}$ at $|\varphi_1-\varphi_2|=1.618014$ and $\varphi_1+\varphi_2=0.514042$ $D_1 = \dfrac{1.618014}{0.514042} = 3.147630$ and $a_1 = 0.46976$, so that $\dfrac{D_1}{a_1} = \dfrac{3.147630}{0.46976} = 6.70051$ and thus (4) $\quad 4\Phi < 6.70051 < 9\Phi$ (V) $\quad D_2 = \dfrac{|\varphi_3-\varphi_4|}{|\varphi_3+\varphi_4|} = 4.125055$ $D_3 = \dfrac{|\varphi_5-\varphi_6|}{|\varphi_5+\varphi_6|} = 0.858489$ $D_4 = \dfrac{|\varphi_7-\varphi_8|}{|\varphi_7-\varphi_8|} = 0.477763$ $\dfrac{D_2}{D_3} = \dfrac{4.125055}{0.858489} = 4.805018$ $\dfrac{D_3}{D_4} = \dfrac{0.858489}{0.477763} = 1.796893$ $\dfrac{\left|\dfrac{D_2}{D_3}\right|}{\left|\dfrac{D_3}{D_4}\right|} = \dfrac{4.805018}{1.796893} = 2.674070$ and thus (5) $\quad 1 < 2.674070 < 3$ In the objective characterized by the above numerical data of Example I the following tolerances can be used with practically equal correction effects:

$\varphi = \dfrac{\Delta_n}{R} = \pm \dfrac{0.2}{f}; \quad d = \pm 0.05f; \quad a = \pm 0.05f$

Example 2

$[f=1.0000 \quad 1:3.4 \quad s'_0=1.0520.]$

| | | | |
|---|---|---|---|
| $R_1 = +0.898582$ | $d_1 = 0.06208$ | $n_1=1.50137; \nu_1=56.5$ | $\varphi_1 = +0.557957$ |
| $R_2 = +0.460479$ | $a_1 = 0.49524$ | air | $\varphi_2 = -1.088801$ |
| $R_3 = +1.032145$ | $d_2 = 0.04690$ | $n_2=1.66672; \nu_2=48.4$ | $\varphi_3 = +0.645956$ |
| $R_4 = +3.662309$ | $a_2 = 0.00497$ | air | $\varphi_4 = -0.182049$ |
| $R_5 = +0.491656$ | $d_3 = 0.17934$ | $n_3=1.62045; \nu_3=38.0$ | $\varphi_5 = +1.261960$ |
| $R_6 = -2.763148$ | $a_3 = 0.02759$ | air | $\varphi_6 = +0.224545$ |
| $R_7 = -0.935885$ | $d_4 = 0.01600$ | $n_4=1.60342; \nu_4=38.0$ | $\varphi_7 = -0.644759$ |
| $R_8 = +0.344048$ | $a_4 = 0.06346$ | air, diaphragm space | $\varphi_8 = -1.753883$ |
| $R_9 = -4.044708$ | $d_5 = 0.01380$ | $n_5=1.61293; \nu_5=37.0$ | $\varphi_9 = -0.15139$ |
| $R_{10} = +0.282903$ | $a_5 = 0.00000$ | cemented surface | $\varphi_{10} = -2.166573$ |
| $R_{11} = +0.282903$ | $d_6 = 0.15313$ | $n_6=1.69350; \nu_6=53.4$ | $\varphi_{11} = +2.451370$ |
| $R_{12} = -0.527964$ | | | $\varphi_{12} = +1.313537$ |

The above data show:

(I) $\quad |\varphi_6+\varphi_7|=0.420214$ and thus at $\Phi=1$
(1) $\quad 0.25 < 0.420214 < 0.75$ (II) $\quad |\varphi_6-\varphi_7|=0.869304$ and thus
(2) $\quad 0.5 < 0.869304 < 1.5$ (III) $\dfrac{|\varphi_6+\varphi_7|}{\varphi_3+\varphi_4}=0.905815$ and thus (3) $\qquad 0.25<0.905815<1.25$ (IV) $D_1=\dfrac{|\varphi_1-\varphi_2|}{|\varphi_1+\varphi_2|}=3.102151$ and $a_1=0.49524$ thus, $\dfrac{|D_1|}{|a_1|}=6.26393$ so that (4) $\qquad 4\Phi<6.26293<9\Phi$ (V) $D_2=\dfrac{|\varphi_3-\varphi_4|}{|\varphi_3+\varphi_4|}=1.784851$ $D_3=\dfrac{|\varphi_5-\varphi_6|}{|\varphi_5+\varphi_6|}=0.697889$ $D_4=\dfrac{|\varphi_7-\varphi_8|}{|\varphi_7+\varphi_8|}=0.462397$ $\dfrac{D_2}{D_3}=\dfrac{1.784851}{0.697889}=2.557500$ $\dfrac{D_3}{D_4}=\dfrac{0.697889}{0.462397}=1.509285$ $\dfrac{\left|\dfrac{D_2}{D_3}\right|}{\left|\dfrac{D_3}{D_4}\right|}=\dfrac{2.557500}{1.509285}=1.69451$, so that (5) $\qquad 1<1.69451<3$ In the objective characterized by the above numerical data of Example 2, the following tolerances can be used with practically equal correction effects:

$\varphi=\dfrac{\Delta_n}{R}=\pm\dfrac{0.2}{f}; \quad d=\pm 0.05f; \quad a=\pm 0.05f$

Example 3

[$f=1.0000 \qquad 1:2,8 \qquad s'_0=1.0505$.]

| | | | |
|---|---|---|---|
| $R_1 =+1.260617$ | $d_1=0.06213$ | $n_1=1.62374; \nu_1=47.0$ | $\varphi_1 =+0.494789$ |
| $R_2 =+0.593764$ | $a_1=0.65606$ | air | $\varphi_2 =-1.050485$ |
| $R_3 =+1.152130$ | $d_2=0.06903$ | $n_2=1.66672; \nu_2=84.4$ | $\varphi_3 =+0.578685$ |
| $R_4 =-11.275279$ | $a_2=0.02209$ | air | $\varphi_4 =+0.059131$ |
| $R_5 =+0.522802$ | $d_3=0.19880$ | $n_3=1.62045; \nu_3=38.0$ | $\varphi_5 =+1.186778$ |
| $R_6 =-1.614186$ | $a_3=0.02209$ | air | $\varphi_6 =+0.384373$ |
| $R_7 =-0.879878$ | $d_4=0.03424$ | $n_4=1.62536; \nu_4=35.6$ | $\varphi_7 =-0.710735$ |
| $R_8 =+0.367016$ | $a_4=0.08560$ | air; diaphragm space | $\varphi_8 =-1.703904$ |
| $R_9 =-1.924128$ | $d_5=0.01381$ | $n_5=1.65128; \nu_5=38.3$ | $\varphi_9 =-0.338481$ |
| $R_{10}=+0.294946$ | $a_5=0.00000$ | Cemented surface | $\varphi_{10}=-2.208133$ |
| $R_{11}=+0.294946$ | $d_6=0.15048$ | $n_6=1.69350; \nu_6=53.39$ | $\varphi_{11}=+2.351278$ |
| $R_{12}=-0.540087$ | | | $\varphi_{12}=+1.284052$ |

The above data show:

(I) $\qquad |\varphi_6+\varphi_7|=0.326362$ and thus at $\Phi=1$ (1) $\qquad 0.25<0.326362<0.75$ (II) $\qquad |\varphi_6-\varphi_7|=1.095108$ and thus (2) $\qquad 0.5<1.095108<1.5$ (III) $\qquad \dfrac{|\varphi_6+\varphi_7|}{\varphi_3+\varphi_4}=0.511687$ and thus (3) $\qquad 0.25<0.511687<1.25$ (IV) $\qquad D_1=\dfrac{|\varphi_1-\varphi_2|}{|\varphi_1+\varphi_2|}=2.780790$ and $a_1=0.65606$ so that $\dfrac{|D_1|}{|a_1|}=4.23862$ and thus (4) $\qquad 4\Phi<4.23862<9\Phi$ (V) $D_2=\dfrac{|\varphi_3-\varphi_4|}{|\varphi_3+\varphi_4|}=0.814583$ $D_3=\dfrac{|\varphi_5-\varphi_6|}{|\varphi_5+\varphi_6|}=0.510712$ $D_4=\dfrac{|\varphi_7-\varphi_8|}{|\varphi_7+\varphi_8|}=0.411312$ $\dfrac{D_2}{D_3}=\dfrac{0.814583}{0.510712}=1.594995$ $\dfrac{D_3}{D_4}=\dfrac{0.510712}{0.411312}=1.241666$ $\dfrac{\left|\dfrac{D_2}{D_3}\right|}{\left|\dfrac{D_3}{D_4}\right|}=\dfrac{1.594995}{1.241666}=1.28456$, so that (5) $\qquad 1<1.28456<3$ In the objective characterized by the above numerical data of Example 3, the following tolerances can be used with practically equal correction effects:

$\varphi=\dfrac{\Delta_n}{R}=\pm\dfrac{0.2}{f}; \quad d=\pm 0.05f; \quad a=\pm 0.05f$ It will be understood from the above that this invention is not limited to the specific conditions, dimensions, designs and other details specifically described above and illustrated in the drawings and can be carried out with various modifications without departing from the scope of the invention as defined in the appended claims.

What is claimed is:

1. A photographic objective of the extended triplet type, having a long back focal length in the range of 85% and 125% of the equivalent focal length and comprising on the side of the longer conjugate a diverging, meniscus-shaped front member, the surfaces of which are concave toward the diaphragm; said front member being spaced from a subsequent converging system of lenses by a distance which is smaller than 75% of the equivalent focal length of the total objective and is greater than ⅓ of the equivalent focal length of the total objective; said subsequent converging system of lenses consisting of a triplet variation including a converging lens additionally inserted on the front side of said triplet variation, followed by a strongly refractive converging lens, which, in turn, is followed by a diverging lens having surfaces of unequal curvature; distribution of the refractive power within the total objective, in the pair of vicinal surfaces, formed by the rear surface of said strongly refractive converging lens and the front surface of said diverging lens of unequal curvature, between this converging lens and this diverging lens, being carried out in such a manner that the absolute value of the sum of surface refractive powers in said pair of vicinal surfaces is larger than ¼ of the equivalent refractive power of the total system, but does not exceed ¾ of said equivalent refractive power of the total system; the refractive powers $$\left(\varphi = \frac{\Delta n}{R}\right)$$

showing tolerances not exceeding $$\pm \frac{0.2}{f}$$

and the thicknesses of the lenses, as well as the air spaces, showing tolerances not exceeding $\pm 0.05f$ with reference to the following data:

| | | | | |
|---|---|---|---|---|
| $R_1 = +0.01 \cdot f$ | $d_1 = 0.06 \cdot f$ | $n_1 = 1.50$ | $\nu_1 = 57$ | $\varphi_1 = +0.55\Phi$ |
| $R_2 = +0.47 \cdot f$ | $a_1 = 0.47 \cdot f$ | | | $\varphi_2 = -1.07\Phi$ |
| $R_3 = +0.54 \cdot f$ | $d_2 = 0.05 \cdot f$ | $n_2 = 1.66$ | $\nu_2 = 36$ | $\varphi_3 = +1.24\Phi$ |
| $R_4 = +0.88 \cdot f$ | $a_2 = 0.005 \cdot f$ | | | $\varphi_4 = -0.76\Phi$ |
| $R_5 = +0.45 \cdot f$ | $d_3 = 0.11 \cdot f$ | $n_3 = 1.62$ | $\nu_3 = 47$ | $\varphi_5 = +1.40\Phi$ |
| $R_6 = -5.86 \cdot f$ | $a_3 = 0.03 \cdot f$ | | | $\varphi_6 = +0.11\Phi$ |
| $R_7 = -0.97 \cdot f$ | $d_4 = 0.02 \cdot f$ | $n_4 = 1.61$ | $\nu_4 = 40$ | $\varphi_7 = -0.63\Phi$ |
| $R_8 = +0.34 \cdot f$ | $a_4 = 0.06 \cdot f$ | | | $\varphi_8 = -1.78\Phi$ |
| $R_9 = +84.59 \cdot f$ | $d_5 = 0.01 \cdot f$ | $n_5 = 1.62$ | $\nu_5 = 37$ | $\varphi_9 = +0.01\Phi$ |
| $R_{10} = +0.33 \cdot f$ | $a_5 = 0$ | | | $\varphi_{10} = -1.85\Phi$ |
| $R_{11} = +0.33 \cdot f$ | $d_6 = 0.15 \cdot f$ | $n_6 = 1.69$ | $\nu_6 = 55$ | $\varphi_{11} = +2.08\Phi$ |
| $R_{12} = -0.57 \cdot f$ | | | | $\varphi_{12} = +1.21\Phi$ | wherein $R_1 \ldots R_{12}$ denote the radii of curvature of the individual lens surfaces; $d_2 \ldots d_6$ denote the distances between the vertexes of the lens surfaces; $a_1 \ldots a_5$ denote the axial distances between the individual lenses, $n_1 \ldots n_6$ denote the refractive indices of the lenses, $\nu_1 \ldots \nu_6$ the Abbe numbers and $\varphi_1 \ldots \varphi_{12}$ the surface refractive powers, in the direction of the light, the latter given as multiples of the equivalent refractive power $\Phi$ of the total system.

2. A photographic objective of the extended triplet type, having a long back focal length in the range of 85% and 125% of the equivalent focal length and comprising on the side of the longer conjugate a diverging, meniscus-shaped front member, the surfaces of which are concave toward the diaphragm; said front member being spaced from a subsequent converging system of lenses by a distance which is smaller than 75% of the equivalent focal length of the total objective and is greater than ⅓ of the equivalent focal length of the total objective; said subsequent converging system of lenses consisting of a triplet variation including a converging lens additionally inserted on the front side of said triplet variation, followed by a strongly refractive converging lens, which, in turn, is followed by a diverging lens having surfaces of unequal curvature; distribution of the refractive power within the total objective, in the pair of vicinal surfaces, formed by the rear surface of said strongly refractive converging lens and the front surface of said diverging lens of unequal curvature, between this converging lens and this diverging lens, being carried out in such a manner that the absolute value of the sum of surface refractive powers in said pair of vicinal surfaces is larger than ¼ of the equivalent refractive power of the total system, but does not exceed ¾ of said equivalent refractive power of the total system; the refractive powers $$\left(\varphi = \frac{\Delta n}{R}\right)$$

showing tolerances not exceeding $$\pm \frac{0.2}{f}$$

and the thicknesses of the lenses, as well as the air spaces, showing the tolerances not exceeding $\pm 0.05f$ with reference to the following data:

| | | | | |
|---|---|---|---|---|
| $R_1 = +0.90 \cdot f$ | $d_1 = 0.06 \cdot f$ | $n_1 = 1.50$ | $\nu_1 = 57$ | $\varphi_1 = +0.56\Phi$ |
| $R_2 = +0.46 \cdot f$ | $a_1 = 0.50 \cdot f$ | | | $\varphi_2 = -1.09\Phi$ |
| $R_3 = +1.03 \cdot f$ | | | | $\varphi_3 = +0.65\Phi$ |
| $R_4 = +3.66 \cdot f$ | $d_2 = 0.05 \cdot f$ | $n_2 = 1.67$ | $\nu_2 = 48$ | $\varphi_4 = -0.18\Phi$ |
| $R_5 = +0.49 \cdot f$ | $a_2 = 0.005 \cdot f$ | | | $\varphi_5 = +1.26\Phi$ |
| $R_6 = -2.76 \cdot f$ | $d_3 = 0.18 \cdot f$ | $n_3 = 1.62$ | $\nu_3 = 38$ | $\varphi_6 = +0.22\Phi$ |
| $R_7 = -0.94 \cdot f$ | $a_3 = 0.03 \cdot f$ | | | $\varphi_7 = -0.64\Phi$ |
| $R_8 = +0.34 \cdot f$ | $d_4 = 0.02 \cdot f$ | $n_4 = 1.60$ | $\nu_4 = 38$ | $\varphi_8 = -1.75\Phi$ |
| $R_9 = -4.04 \cdot f$ | $a_4 = 0.06 \cdot f$ | | | $\varphi_9 = -0.15\Phi$ |
| $R_{10} = +0.28 \cdot f$ | $d_5 = 0.01 \cdot f$ | $n_5 = 1.61$ | $\nu_5 = 37$ | $\varphi_{10} = -2.17\Phi$ |
| $R_{11} = +0.28 \cdot f$ | $a_5 = 0$ | | | $\varphi_{11} = +2.45\Phi$ |
| $R_{12} = -0.53 \cdot f$ | $d_6 = 0.15 \cdot f$ | $n_6 = 1.69$ | $\nu_6 = 53$ | $\varphi_{12} = +1.31\Phi$ | wherein $R_1 \ldots R_{12}$ denote the radii of curvature of the individual lens surfaces; $d_1 \ldots d_6$ denote the distances between the vertexes of the lens surfaces; $a_1 \ldots a_5$ denote the axial distances between the individual lenses, $n_1 \ldots n_6$ denote the refractive indices of the lenses, $\nu_1 \ldots \nu_6$ the Abbe numbers and $\varphi_1 \ldots \varphi_{12}$ the surface refractive powers, in the direction of the light, the latter given as multiples of the equivalent refractive power $\Phi$ of the total system.

3. A photographic objective of the extended triplet type, having a long back focal length in the range of 85% and 125% of the equivalent focal length and comprising on the side of the longer conjugate a diverging, meniscus-shaped front member, the surfaces of which are concave toward the diaphragm; said front member being spaced from a subsequent converging system of lenses by a distance which is smaller than 75% of the equivalent focal length of the total objective and is greater than ⅓ of the equivalent focal length of the total objective; said subsequent converging system of lenses consisting of a triplet variation including a converging lens additionally inserted on the front side of said triplet variation, followed by a strongly refractive converging lens, which, in turn, is followed by a diverging lens having surfaces of unequal curvature; distribution of the refractive power within the total objective, in the pair of vicinal surfaces, formed by the rear surface of said strongly refractive converging lens and the front surface of said diverging lens of unequal curvature, between this converging lens and this diverging lens, being carried out in such a manner that the absolute value of the sum of surface refractive powers in said pair of vicinal surfaces is larger than ¼ of the equivalent refractive power of the total system, but does not exceed ¾ of said equivalent refractive power of the total system; the refractive powers $$\left(\varphi = \frac{\Delta n}{R}\right)$$

showing tolerance not exceeding $$\pm \frac{0.2}{f}$$

and the thicknesses of the lenses, as well as the air spaces, showing tolerances, not exceeding $\pm 0.05f$ with reference to the following data:

| $R_1 = +1.26 \cdot f$ | | | | $\varphi_1 = +0.49\Phi$ |
|---|---|---|---|---|
| | $d_1 = 0.06 \cdot f$ | $n_1 = 1.62$ | $\nu_1 = 47$ | |
| $R_2 = +0.59 \cdot f$ | | | | $\varphi_2 = -1.05\Phi$ |
| | $a_1 = 0.66 \cdot f$ | | | |
| $R_3 = +1.15 \cdot f$ | | | | $\varphi_3 = +0.58\Phi$ |
| | $d_2 = 0.07 \cdot f$ | $n_2 = 1.67$ | $\nu_2 = 48$ | |
| $R_4 = -11.28 \cdot f$ | | | | $\varphi_4 = +0.06\Phi$ |
| | $a_2 = 0.02 \cdot f$ | | | |
| $R_5 = +0.52 \cdot f$ | | | | $\varphi_5 = +1.19\Phi$ |
| | $d_3 = 0.20 \cdot f$ | $n_3 = 1.62$ | $\nu_3 = 38$ | |
| $R_6 = -1.61 \cdot f$ | | | | $\varphi_6 = +0.38\Phi$ |
| | $a_3 = 0.02 \cdot f$ | | | |
| $R_7 = -0.88 \cdot f$ | | | | $\varphi_7 = -0.71\Phi$ |
| | $d_4 = 0.03 \cdot f$ | $n_4 = 1.63$ | $\nu_4 = 36$ | |
| $R_8 = +0.37 \cdot f$ | | | | $\varphi_8 = -1.70\Phi$ |
| | $a_4 = 0.09 \cdot f$ | | | |
| $R_9 = -1.92 \cdot f$ | | | | $\varphi_9 = -0.34\Phi$ |
| | $d_5 = 0.01 \cdot f$ | $n_5 = 1.65$ | $\nu_5 = 38$ | |
| $R_{10} = +0.29 \cdot f$ | | | | $\varphi_{10} = -2.21\Phi$ |
| | $a_5 = 0$ | | | |
| $R_{11} = +0.29 \cdot f$ | | | | $\varphi_{11} = +2.35\Phi$ |
| | $d_6 = 0.15 \cdot f$ | $n_6 = 1.69$ | $\nu_6 = 53$ | |
| $R_{12} = -0.54 \cdot f$ | | | | $\varphi_{12} = +1.28\Phi$ | wherein $R_1 \ldots R_{12}$ denote the radii of curvature of the individual lens surfaces; $d_1 \ldots d_6$ denote the distances between the vertexes of the lens surfaces; $a_1 \ldots a_5$ denote the axial distances between the individual lenses, $n_1 \ldots n_6$ denote the refractive indices of the lenses, $\nu_1 \ldots \nu_6$ the Abbe numbers and $\varphi_1 \ldots \varphi_{12}$ the surface refractive powers, in the direction of the light, the latter given as multiples of the equivalent refractive power $\Phi$ of the total system.

4. A photographic objective as claimed in claim 1, in which the diverging meniscus-shaped front member meets the condition $$4.\Phi < \frac{\varphi_1 + \varphi_2}{a_1} < 9.\Phi$$

wherein $\Phi$ stands for the equivalent refractive power of the total objective-system, $\varphi_1$ and $\varphi_2$ stand for the surface refractive powers of the front surface and rear surface, respectively, of said diverging meniscus shaped front member; and the converging lens inserted on the front side of the triplet variation of the converging system of lenses of the objective and the first and second lens, in the direction of light, of said triplet variation meet the condition $$1 < \frac{\left|\frac{D_2}{D_3}\right|}{\left|\frac{D_3}{D_4}\right|} < 3$$

wherein $D_2$, $D_3$ and $D_4$ stand for the curvature distributions, respectively, (a) of said converging lens inserted on the front side of the triplet variation, (b) of said first lens of the triplet variation and (c) of said second lens of the triplet variation, said curvature distributions being expressed by the quotient of surface powers $$D = \frac{\varphi_f - \varphi_r}{\varphi_f + \varphi_r}$$

wherein $\varphi_f$ and $\varphi_r$ stand for the surface refractive powers of the front and rear surfaces, respectively, in the direction of light, of said lenses (a), (b) and (c), respectively.

5. A photographic objective as claimed in claim 2, in which the diverging meniscus-shaped front member meets the conditions $$4.\Phi < \frac{\varphi_1 + \varphi_2}{a_1} < 9.\Phi$$

wherein $\Phi$ stands for the equivalent refractive power of the total objective-system, $\varphi_1$ and $\varphi_2$ stand for the surface refractive powers of the front surface and rear surface, respectively, of said diverging meniscus shaped front member; and the converging lens inserted on the front side of the triplet variation of the converging system of lenses of the objective and the first and second lens, in the direction of light, of said triplet variation meet the condition $$1 < \frac{\left|\frac{D_2}{D_3}\right|}{\left|\frac{D_3}{D_4}\right|} < 3$$

wherein $D_2$, $D_3$ and $D_4$ stand for the curvature distributions, respectively, (a) of said converging lens inserted on the front side of the triplet variation, (b) of said first lens of the triplet variation, and (c) of said second lens of the triplet variation, said curvature distributions being expressed by the quotient of surface powers $$D = \frac{\varphi_f - \varphi_r}{\varphi_f + \varphi_r}$$

wherein $\varphi_f$ and $\varphi_r$ stand for the surface refractive powers of the front and rear surfaces, respectively, in the direction of light, of said lenses (a), (b) and (c), respectively.

6. A photographic objective as claimed in claim 3, in which the diverging meniscus-shaped front member meets the condition $$4.\Phi < \frac{\varphi_1 + \varphi_2}{a_1} < 9.\Phi$$

wherein $\Phi$ stands for the equivalent refractive power of the total objective-system, $\varphi_1$ and $\varphi_2$ stands for the surface refractive powers of the front surface and rear surface, respectively, of said diverging meniscus shaped front member; and the converging lens inserted on the front side of the triplet variation of the converging system of lenses of the objective and the first and second lens, in the direction of light, of said triplet variation meet the condition $$1 < \frac{\left|\frac{D_2}{D_3}\right|}{\left|\frac{D_3}{D_4}\right|} < 3$$

wherein $D_2$, $D_3$ and $D_4$ stand for the curvature distributions, respectively, (a) of said converging lens inserted on the front side of the triplet variation, (b) of said first lens of the triplet variation, and (c) of said second lens of the triplet variation, said curvature distributions being expressed by the quotient of surface powers $$D = \frac{\varphi_f - \varphi_r}{\varphi_f + \varphi_r}$$

wherein $\varphi_f$ and $\varphi_r$ stand for the surface refractive powers of the front and rear surfaces, respectively, in the direction of light, of said lenses (a), (b) and (c), respectively.

References Cited in the file of this patent
UNITED STATES PATENTS

| 1,934,561 | Rayton | Nov. 7, 1933 |
|---|---|---|
| 2,298,853 | Warmisham | Oct. 13, 1942 |
| 2,649,022 | Angenieux | Aug. 18, 1953 |
| 2,746,351 | Tronnier | May 22, 1956 |
| 2,826,115 | Lange | Mar. 11, 1958 |